United States Patent [19]

Takamatsu et al.

[11] 4,254,323
[45] Mar. 3, 1981

[54] APPARATUS FOR MONITORING AND CONTROLLING A WELDING PHENOMENON IN AN ELECTRIC RESISTANCE WELDING

[75] Inventors: Toshio Takamatsu, Zushi; Hiroyo Haga, Machida; Kazuo Aoki, Kawasaki; Takeshi Sato, Machida, all of Japan

[73] Assignee: Nippon Steel Corporation, Tokyo, Japan

[21] Appl. No.: 916,075

[22] Filed: Jun. 16, 1978

[51] Int. Cl.³ .............................................. B23K 11/06
[52] U.S. Cl. ................................. 219/110; 219/61.2; 219/61.5; 219/109
[58] Field of Search ............... 219/7.5, 8.5, 9.5, 10.77, 219/61.2, 61.5, 108, 109, 110; 324/78 D, 79 D, 83 D

[56] References Cited

U.S. PATENT DOCUMENTS

| 2,794,893 | 6/1957 | Crawford | 219/8.5 |
|---|---|---|---|
| 3,253,112 | 5/1966 | Worden | 219/8.5 |
| 3,573,416 | 4/1971 | Drechsler | 219/8.5 |
| 3,718,852 | 2/1973 | Bailey | 219/10.77 |
| 3,842,347 | 10/1974 | Terbrack | 324/78 D |
| 4,070,618 | 1/1978 | Thomas | 324/83 D |

FOREIGN PATENT DOCUMENTS 742315  9/1966 Canada ................................... 219/8.5

Primary Examiner—C. C. Shaw

[57] ABSTRACT

An apparatus for monitoring and controlling a welding phenomenon in an electric resistance welding process, which comprises a welding characteristics measuring instrument for carrying out digital measurement of at least one of high frequency welding characteristics, a welding phenomenon monitor circuit for detecting variations in the welding characteristics, and a welding phenomenon controller circuit for automatically adjusting a parameter of a welding power source or other welding conditions, wherein the welding characteristics include an oscillating frequency and an oscillating period of a high frequency used for the welding, and a phase difference between a high frequency voltage and a current. Changes in the welding characteristics occur in correspondence with the occurrence of periodic fluctuations in the shape of the high frequency welding current circuit formed in the material to be welded during high frequency electric resistance welding process.

17 Claims, 5 Drawing Figures

APPARATUS FOR MONITORING AND CONTROLLING A WELDING PHENOMENON IN AN ELECTRIC RESISTANCE WELDING

BACKGROUND OF THE INVENTION

The present invention relates to an apparatus for monitoring and controlling a welding phenomenon in an electric resistance welding.

Previously, welding conditions in the electric resistance welding have been usually determined by operating personnel who conduct visual observation concerning spatter of a portion being welded or external flash of a weld bead and consider a size and a kind of material to be welded as well an anode voltage and an anode current which indicate a tendency of the welding phenomenon. To carry out these operations, considerable skillfulness and experience should be required as variations occur in respective operating procedures conducted by different operators, causing fatigue of the operator and therefore, it is difficult to carry out electric resistance welding under constant welding conditions even by skilled operators.

To improve these inferiorities appearing in the above-mentioned technique, a method was proposed, wherein a welding current or a temperature at a weld seam is measured and compared with a predetermined value corresponding thereto, and a control of a welding power source or a welding rate is carried out based on a deviation therebetween. However, there are several factors such as an upset amount, a Vee shape, manner of edge match, size and properties of material to be welded as well as the welding current or the welding rate, which complementingly interrelate with each other and therefore, important inferiorities as shown below appear when employing only the welding current or the weld seam temperature for determining the welding condition.

(i) The method for constantly controlling the welding current with respect to the predetermined value is not suitable in case there exists a variation in the upset amount due to a difference of the size or the properties of the material to be welded since such variation causes an optimal welding current to change.

(ii) The method for detecting the weld seam temperature is also unfavorable. The welding current must be increased in response to an increase in the welding rate. However, a temperature controller according to this method causes the welding current to decrease when increasing the welding rate because, even though the actual temperature does not change, the detected temperature becomes high since a cooling time corresponding to a traveling time of the material to be welded from a weld point to a temperature detecting point becomes short.

(iii) A complementary apparatus having many sensing elements and many calculating circuits is required in order to eliminate the above-mentioned disadvantages shown in (i) and (ii), when such improvement is conducted on the basis of only conventional technical thought which is as follows: To improve the abovementioned conventional techniques which do not respond to or do not correctly respond to the variation in the welding conditions, all of the variable factors relating to the welding conditions must be detected and calculations whose results are utilized for the control must be carried out by considering interrelationships existing among the variable factors since the feedback control wherein the welding current or the temperature is constantly maintained is not sufficient for conducting the precise control.

(iv) In addition, the above-mentioned control based on the detection of all variable factors in the welding is practically impossible since accurate calculating methods cannot be established without carrying out enormous trials and errors.

By the way, the following consideration relating to the welding phenomenon in the electric resistance welding has been previously accepted which is as follows: Strip edges to which the high frequency current is applied from V-shaped configuration and approach each other, being welded at a V-convergence point, while being subjected to efficient heating due to a skin effect and a proximity effect of the high frequency current.

In order to improve the conventional techniques, we have concentrated on the study of a basic welding phenomenon in the electric resistance welding by observing successive welding phenomenon consisting of heating, melting amd pressurizing at the strip edges in an area from a high frequency feeding point to a central portion of a squeeze roll with respect to a number of pipes having different sizes in diameter and thickness in different welding conditions which are the welding rate, the welding current, the position of the feeding point, the upset amount, and an amount of a Vee angle, by using a high speed photograph. As a result, we have found the welding phenomenon which is different from an ordinary conventional technical concept, on which we submitted a patent application which was laid open to public inspection as Japanese Patent Publication No. 111851/1977 and reported in conference held by the Iron and Steel Institute of Japan in October, 1977 (Lecture No. 232,233) and by the Japan Welding Society in November, 1977 (Lecture No. 408,409) in Japan.

Referring to the attached drawing, an explanation concerning the above-mentioned findings will be given. FIGS. 1a, 1b and 1c, are schematic views for illustration of the welding phenomenon, which respectively show a first-type welding phenomenon, a second-type welding phenomenon and a third-type welding phenomenon wherein P is a material or a pipe to be welded, V is a V-convergence point, W is a weld point, M and N are strip edges, X, Y are welding contacts, and S is a squeeze roll.

In each type of the welding phenomena mentioned above, there exists periodic movement of the weld point W with respect to the V-convergence point V which is formed by the strip edges M and N and whose position is constantly maintained.

When a change occurs in the welding phenomenon from the first type to the second and hence to the third type welding phenomenon, an amount of fluctuation period of the position of the weld point and a fluctuation width (a moving distance) become large.

By way of example, the fluctuation period corresponding to the phenomenon of FIGS. 1(a), 1(b) and 1(c) are, respectively, less than 1 msec, 1 msec–10 msec, and 10 msec–1000 msec.

Next, a detailed explanation as to the welding phenomenon will be shown. The strip edges electromagnetically repel each other since the high frequency current inversely flows in each strip edge and is high in current density, and the electromagnetic repulsive force on both of the edges causes molten metal to extrude toward an inner or outer surface of the strip, forming a weld bead after melting edge surfaces. Therefore, when increasing the amount of heat input and extruding some amount of the molten metal, a formation of a parallel slit gap directing from the V-convergence point to a central portion of the squeeze roll rather than welding of the slit gap at V-convergence occurs as shown in FIG. 1 (b). Under this situation, the weld point is produced at the tip portion of the slit gap which tends to move at a rate being the same as the welding rate, while molten metal for bridging across the parallel slit gap is frequently produced at the V-convergence point, said molten metal moves to the tip portion of the slit at a high moving rate due to the electromagnetic force. Thus periodic fluctuation of the weld point which is recognized to be included in the second-type welding phenomenon, occurs.

When increasing the heat input, the slit width becomes greater, the tip portion of the slit moves a considerable distance in association with the movement of the pipe but the strip edges are not welded during this time. When the distance between the V-convergence point and the weld point reaches a considerable amount, both of the strip edges suddenly contact at the V-convergence point where molten metal is formed bridging across the gap and said molten metal is rapidly moved to the weld point due to the electromagnetic force. Thus welding of the slit gap is effected in a very short time due to the movemet of the molten metal and due to a filling phenomenon of the slit gap with the weld bead when the electromagnetic force applied thereto disappears resulting from the bridging phenomenon. As a result, the tip portion of the slit is forced to return to near the V-convergence point.

The periodic repetition of the above-mentioned phenomenon produces the third-type of welding phenomenon. The periodic fluctuation in each welding phenomenon cannot be eliminated by constantly maintaining the welding conditions such as the heat input and the welding rate and by eliminating vibration due to eccentric arrangement of the rolls and the like since such periodic fluctuation is to be considered as one of the basic phenomena in the welding process.

We considered that fluctuation of the position of the weld point W is a primary factor which affects the shape of the weld bead, the spatter of the weld portion and the stability of the quality of the welded articles.

The positional fluctuation of the weld point W causes a periodic fluctuation in the shape of a welding current circuit formed in the material to be welded along a loop X-V-W-V-Y. In other words or from an electrical viewpoint, the positional fluctuation causes the periodical fluctuation in load impedance. Generally, the electric resistance welding machine utilizes a self-oscillation system and thus, in the oscillating frequency of high frequency used for the welding, and phase difference between the high frequency voltage and the high frequency current, periodical fluctuation is produced in association with the periodic fluctuation of the load impedance. From the relationship of (period)=1/(frequency), it is obvious that the high frequency oscillating period also contains the periodic fluctuation.

A measurement concerning at least one of the welding characteristics, which are referred to as "high frequency welding characteristics" hereinafter, consisting of the period, the frequency and the phase difference, permits a detection of the variation in the shape of the welding current circuit, thereby the type of welding phenomenon can be precisely grasped.

Concerning this measurement, we proposed in the above-mentioned Japanese Patent Application a method for detecting the variation in the frequency by using FM detection of either modulated high frequency current or modulated voltage and for detecting the variation in the phase difference between the current and the voltage by using a phase discrimination circuit.

After carrying out detailed researches and experiments with respect to the variation in the high frequency welding characteristics due to the above-mentioned welding phenomenon, we found that the amount of the variation in the high frequency welding characteristics is 0.01% to 0.1% in the second-type welding phenomenon and 0.1% to 0.5% in the third-type welding phenomenon.

The variation amount is substantially proportional to the distance between V and W shown in FIG. 1. And the shorter the period of repetitional fluctuation of the weld point W becomes, the lower the variation amount in the high frequency welding characteristics becomes.

Furthermore, we found that these relationships generally exist in the welding machine using the oscillating frequency above 100 KHZ regardless of the type of feeding system, such as a direct feeding or induction feeding, amount of supplied power, size and kind of pipe to be welded.

A detector available for measurement of these welding phenomena based on the above-mentioned facts must be provided with high accuracy to detect a very small variation in the order of 0.01% and frequency characteristics enough to detect the variation period of the weld point W in the order of 1 msec.

When utilizing output signals of the detector being proportional to the variation in the input signals (the high frequency welding characteristics) to control the welding machine, the occurrence of secular change or short time instability in parameters of structural components of the welding machine and change due to differences in pipe size must be eliminated.

It is very difficult to satisfy the above-mentioned requirements such as detection accuracy, frequency characteristics and stability of gain by using the FM detection system or an analog phase discriminator used in an audio device.

SUMMARY OF THE INVENTION

The present invention has been developed on the basis of our knowledge concerning the welding phenomenon explained above to realize our method disclosed in the above-mentioned Japanese Patent Application.

An object of the present invention is to provide an apparatus for monitoring the welding phenomenon by carrying out a digital measurement as to the high frequency welding characteristics.

Another object of the present invention is to provide an apparatus for continuously obtaining quantitative values, which represent the welding phenomenon, on the basis of the digital measurement.

A further object of the present invention is to provide an apparatus for controlling the quantitative value, which represents the welding phenomenon, in order that the quantitative value is constantly maintained at a desired value corresponding to the welding phenomenon to be realized.

A further object of the present invention is to provide an apparatus for adjusting welding conditions such as welding heat input or a welding rate in response to a deviation between the welding phenomenon quantitative value and the desired value in order to monitor and control the welding phenomenon in the high frequency electric resistance welding, thereby an optimal continuous welding process can be carried out and a uniform weld can be obtained regardless of an occurrence of variations in size and properties of material to be welded.

A feature of the present invention resides in that there is provided an apparatus comprising a welding characteristics measuring instrument including a welding characteristics counter for carrying out digital measurement with respect to the high frequency welding characteristics and a reset signal generator for causing the welding characteristics counter to continuously and repeatedly carry out a digital measurement, wherein it is preferable to provide a high frequency voltage sensing element and/or a high frequency current sensing element for detecting the high frequency welding characteristics and a low pass filter for eliminating higher harmonics contained in signals from said high frequency voltage sensing element and/or current sensing element. Output of the welding characteristics measuring instrument may be displayed on a monitoring device to enable operating personnel to grasp the welding phenomenon and may be utilized as control signals for controlling the welding phenomenon.

In order to obtain more correct information as to the welding phenomenon, the apparatus further comprises a welding phenomenon monitor for detecting variations in the welding characteristics, which includes a minuend signal storage device for storing an instant output of the counter and a subtractor for calculating a difference between the output of the counter and that of the storage device and whose outputs may be also displayed on the monitoring device and may be utilized as control signals for adjusting a high frequency power source or a welding rate or the like.

In another embodiment according to the present invention, the apparatus further comprises a welding phenomenon controller for automatically adjusting a parameter of a welding power source or other welding conditions, which includes a digital-to-analog converter for converting an output signal of the subtractor into an analog signal, an AC amplifier for receiving the analog signal from the D/A converter to amplify a variational component thereof, an AC voltmeter for rectifying and integrating an output signal of the AC amplifier to obtain a welding phenomenon quantitative value, and a welding phenomenon quantitative value display device for displaying an output from the AC voltmeter. Furthermore, to carry out an optimal welding process, the apparatus further comprises a welding phenomenon set-point station for presetting a reference signal, a comparator for calculating an amount of an error signal between an output of the AC voltmeter and that of the welding phenomenon set-point station, and a controller for producing signals being utilized for control of the welding phenomenon, for example, which are applied to an AC power source controller for controlling an amount of power supplied to a high frequency welding machine. In addition, it is preferable to provide a welding phenomenon quantitative value recorder for recording outputs of the AC voltmeter.

According to the present invention, the optimal welding process can be continuously carried out under optimal welding phenomenon, whereby uniform and reliable weld can be obtained in the high frequency electric resistance welding.

BRIEF DESCRIPTION OF THE DRAWINGS

FIG. 4 is a block diagram of the welding.

DETAILED DESCRIPTION OF THE PREFERRED EMBODIMENTS

Referring to the attached drawings, preferred embodiments of the present invention will be explained in the following.

Figure 2:
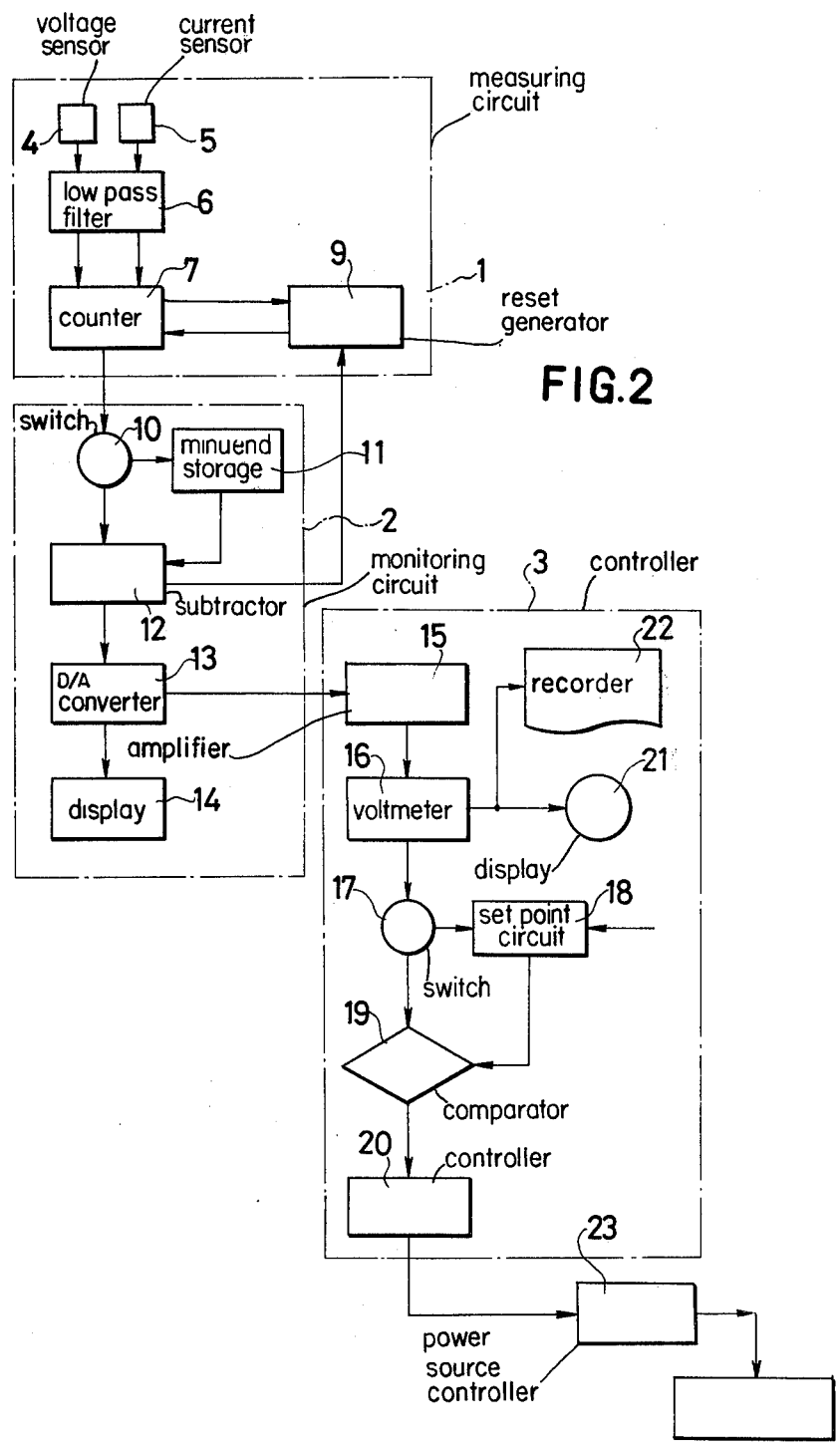
FIG. 2 is a schematic diagram of an apparatus according to an embodiment of the present invention.

FIG. 2 shows a schematic diagram illustrating a preferred embodiment of an apparatus for monitoring and controlling welding phenomenon in high frequency electric resistance welding according to the present invention, which comprises a welding characteristics measuring instrument 1 for carrying out digital measurement concerning at least one high frequency welding characteristic, a welding phenomenon monitor 2 for detecting variations in the welding characteristics and a welding phenomenon controller 3 for automatically adjusting a parameter of a welding power source or other welding conditions.

In this embodiment, the welding characteristics measuring instrument 1 includes a high frequency voltage sensing element 4 and a high frequency current sensing element 5, a low pass filter 6, a welding characteristics counter 7 for carrying out the digital measurement with respect to the high frequency welding characteristics, and a reset signal generator 9 for causing the welding characteristics counter 7 to continuously and repeatedly carry out the digital measurement.

The high frequency voltage sensing element 4 and the high frequency current sensing element 5 should be provided to correctly obtain voltage signals and current signals of a high frequency oscillating circuit in a welding machine. However, a detecting method for obtaining the voltage and current signals and mounting portion of both sensing elements 4, 5 should not be limited except that they should be provided within the high frequency oscillating circuit. The voltage signals, for example, may be obtained by detecting a tank capacitor voltage through an attenuator and the current signals may be detected by using a search coil provided in a suitable portion in the high frequency oscillating circuit. For example, it may be provided near high frequency power leads connected to welding contacts.

The low pass filter 6 is employed for eliminating higher harmonics included in the voltage signals and the current signals and for supplying a fundamental harmonic which is to be applied to and counted by the welding characteristics counter 7.

The welding characteristics counter 7 includes a quartz oscillator for generating stable reference time signals by which an amount of a frequency and a period of the voltage signals or the current signals and a phase difference therebetween can be determined.

That is, the frequency of the voltage or current signals is determined by counting numbers of the voltage signals or the current signals during a unit time; the period thereof is determined by counting and averaging numbers of the reference time signals during the time that a unit number of the voltage or current signals arise, preferably which number is one for carrying out a suitable multi period averaging method to eliminate an error appearing in a "1 count" method; the phase difference between the voltage signals and the current signals is determined by counting numbers of the reference time signals during the time corresponding to a lag time or a lead time of the current signals relative to the voltage signals.

The counter 7 generates a sampling completion signal just when a sampling of the voltage signals and/or current signals is finished and holds the welding characteristics value until next sampling completion signal generates, and carries out the next sampling if the counter 7 receives a reset signal.

FIG. 4 shows a block diagram of the welding characteristics counter as was heretofore described and shows a sampling circuit which receives as its input the high frequency voltage and the high frequency current. An oscillator is provided for generating reference time signals to the sampling circuit. A counter is connected to the sampling circuit for counting at least one welding characteristic value including an oscillating frequency, an oscillating period of the high frequency sampled by the sampling circuit, and a phase difference between the voltage and current sampled. The welding characteristics value changes in correspondence with the occurrence of periodic fluctuations in the shape of the high frequency welding current circuit formed in the material to be welded. A reset signal input is applied to the sampling circuit and a sampling completion signal output is derived therefrom. The output from the counter goes through a hold circuit which provides an output to the controller and to the monitoring device.

The reset signal generator 9 produces the reset signal when receiving either the sampling completion signal or a subtraction completion signal from a subtractor 12, and the reset signal is applied to the counter 7 and causes the counter 7 to start the measuring of the welding characteristics. A determination as to whether the sampling completion signal or the subtraction completion signal should be utilized as the reset signal depends upon a relationship between an amount of a sampling gate time of the counter 7 and that of a subtraction execution time of the subtractor 12. The essential thing in this determination is that the reset signal generator 9 is utilized in a manner that a dead time for finishing the sampling to executing the reset in the counter 7 should be minimized, and that the welding characteristics measuring instrument 1 and the welding phenomenon monitor 2 are operated in stable conditions. That is, if the sampling gate time is greater than the subtraction execution time, the sampling completion signal is used as the reset signal, otherwise, the subtraction completion signal is used.

In the following, the operation of the welding characteristics measuring instrument 1 will be given.

Either the high frequency voltage sensing element 4 or the current sensing element 5 is used as a signal source when the oscillating frequency or the oscillating period of the high frequency flowing through high frequency welding circuit is measured as the welding characteristics value. On the contrary, in case the phase difference between the voltage signals and the current signals is measured as the welding characteristics value, both the sensing elements 4, 5 are used as the signal source.

Signals from the sensing element 4 and/or 5 are supplied to the low pass filter 6 to eliminate components of higher harmonics or parasitic oscillation and to obtain only a fundamental harmonic.

After establishing an operating condition of the welding characteristics counter 7 by manual operation, the counter 7 continuously and repeatedly measures the welding characteristics value by counting outputs of the low pass filter 6, supplying measurement-results in digital form to the monitor 2, wherein the counting of outputs of the filter 6 is carried out by following commands from the reset signal generator 9.

Next, explanations concerning the welding phenomenon monitor 2 will be given. In this embodiment, the monitor 2 includes a switch 10, a minuend signal storage device 11 for storing an instant output of the counter 7, a subtractor 12 for calculating a difference between the output of the counter 7 and that of the storage device 11 in digits, a digital-to-analog converter (D/A converter) 13 for transforming results of the subtraction into analog outputs and a monitoring device 14 for displaying variations of the analog welding characterisics value.

The switch 10 is utilized to supply the output of the counter 7 to either the storage device 11 or the subtractor 12 and causes the storage device 11 to store a momentary signal as the minuend signal therein, the momentary signal being applied to the storage device 11 at the time when switching the output of the counter 7 from the storage device 11 to the subtractor 12 is carried out.

In operation, the signals being supplied to the storage device 11 at the moment when switching action of the switch 10 is executed are stored and held in the storage device 11. After completion of the switching action, succeeding digital signals which continuously and repeatedly generate from the counter 7 are supplied to the subtractor 12. In the subtractor 12, a difference between the digital signal from the counter 7 and the digital signal stored in the minuend signal storage device 11 is calculated and the calculated results may be recognized as corresponding to an amount of the variation in the welding characteristics value resulting from the periodical changes in the shape of a welding current circuit by adequately eliminating time-independent-components contained in the outputs of the counter 7.

The calculating results are applied to the D/A converter 13 as the outputs of the subtractor 12 which produces an output for signaling a completion of the calculation when the respective calculation results are produced and the output is available for causing the reset signal generator 9 to operate.

The D/A converter 13 converts the digital signals from the subtractor 12 into analog signals supplied to the monitoring device 14 and the welding phenomenon controller 3.

Figure 1A:
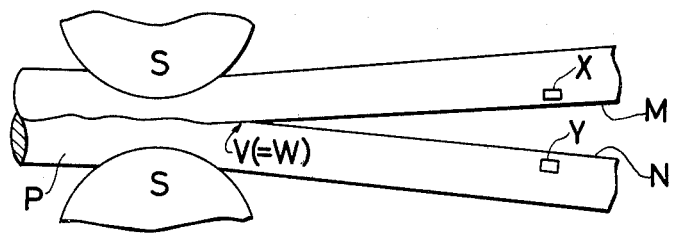
FIG. 1(a) is a schematic view of the first type welding phenomenon.
Figure 1B:
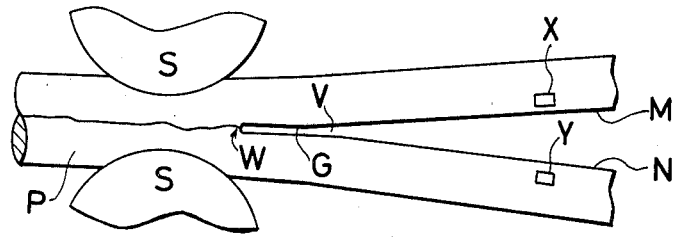
FIG. 1(b) is a schematic view of the second type welding phenomenon.
Figure 1C:
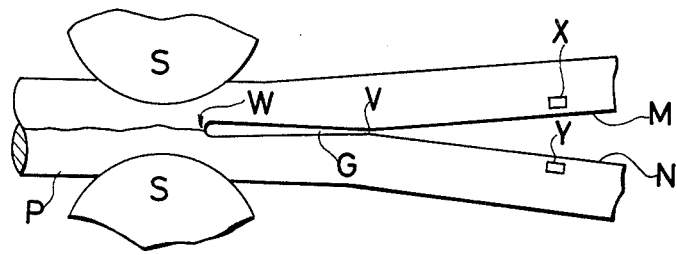
FIG. 1(c) is a schematic view of the third type welding phenomenon.

A CRT oscilloscope may be utilized as the monitoring device 14, by which a variation pattern of the welding characteristics value corresponding to the welding phenomenon shown in FIG. 1 is displayed. This allows operators to precisely observe the welding phenomenon by monitoring the variation pattern displayed by the CRT, thereby manual adjustment of a welding heat input or a welding rate to carry out optimal welding can be performed.

The welding phenomenon controller 3 is available for carrying out automatic adjustment of the welding heat input or the welding rate and includes, in this embodiment, an AC amplifier 15 connected to the D/A convertor, an AC voltmeter 16 for rectifying and integrating an output of the AC amplifier 15, a switch 17 for selecting a signal route through which an output of the AC voltmeter 16 or the welding phenomenon quantitative value is applied, a welding phenomenon set-point station 18 for storing the welding phenomenon quantitative value, a comparator 19, a P.I. controller (proportional and integral controller) 20 for producing a control signal responsive to an output of the comparator 19, a welding phenomenon quantitative value display device 21 connected to the AC voltmeter 16 for displaying an output of the voltmeter 16 and a welding phenomenon quantitative value recorder 22 for recording an output of the welding phenomenon quantitative value display device 21.

A small amount of a direct component included in the output of the D/A converter 13 is eliminated by the AC amplifier 15 to obtain an amplify only a variational component of the welding characteristics value. Outputs of the AC amplifier 15 are rectified and integrated by the AC voltmeter 16 and resultant signals are produced as the welding phenomenon quantitative value. Outputs of the AC voltmeter 16 are supplied to either the welding phenomenon set-point station 18 or the comparator 19, this selection concerning the signal route is determined by the switch 17. When the signal route is switched from the welding phenomenon set-point station 18 to the comparator 19, the welding phenomenon quantitative value which is being applied to the station 18 at this moment is held and stored in the station 18.

In another embodiment, a reference signal may be predetermined by operating personnel by utilizing a potentiometer in place of the signal being held and stored in the station 18.

The comparator 19 provides an output signal proportional to an amount of a deviation between the output of the AC voltmeter 16 and that of the station 18, and PI controller 20 supplies a signal for commanding and determining a firing point of the thyristor to AC power source controller 23 in response to the output of the comparator 19. The controller 23 controls an amount of power supplied to the high frequency welding machine or a mill motor 24.

In operation of the welding phenomenon monitor 3, the AC amplifier 15 amplifies only an alternating component of the output of the D/A converter 13, in other words, variational components of the welding characteristics value and supplies the same to the AC voltmeter 16 which rectifies and integrates input signals supplied thereto, producing values corresponding to the variation pattern of the welding characteristics value, which are quantitative values representing the welding phenomena and are referred to as welding phenomenon quantitative values hereinafter, and are supplied to both the switch 17 and the welding phenomenon quantitative value display device 21.

By observing the variation pattern appearing in the CRT of the monitoring device 14 and the welding phenomenon quantitative value appearing in the welding phenomenon quantitative value display device 21, operators actuate the switch 17 so as to cause the signal route to convert from the welding phenomenon set-point station 18 to the comparator 19 in order to store the welding phenomenon quantitative value appearing at the time a desired welding phenomenon is established in the welding phenomenon set-point station 18.

After performing such switching action of the switch 17, if a change occurs in the welding phenomenon due to variation in size of a member to be welded and in the welding rate, the comparator 19 and the PI controller 20 function responsive to the change in the welding phenomenon so as to adjust the amount of the power supplied from the welding power source or the welding rate, whereby an optimal and constant welding phenomenon is automatically and continuously maintained during the welding process.

In addition, in case of setting the predetermined value in the welding phenomenon set-point station 18 to an optimal one which corresponds to an optimal welding quantitative value, a very short rising time in the early stage in the welding process can be obtained. Resultant data provided by the welding phenomenon quantitative value recorder 22 is very useful for performing quality control of welded articles and to improve welding techniques.

Figure 3:
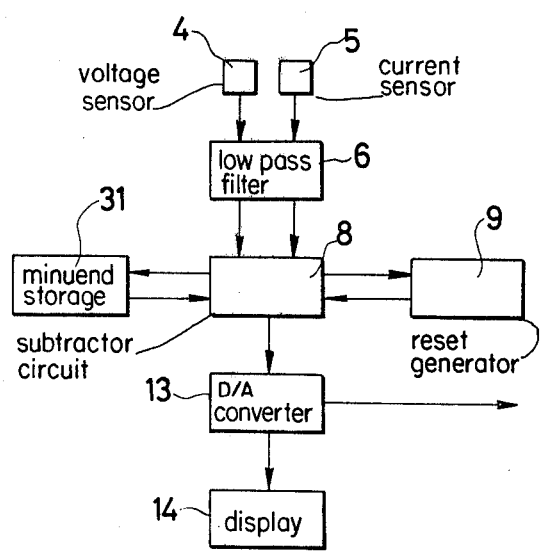
FIG. 3 is a schematic diagram of an apparatus according to another embodiment of the present invention.

FIG. 3 shows another embodiment of the present invention.

The embodiment shown in FIG. 2 which includes the welding characteristics measuring instrument 1 for continuously and repeatedly counting the welding characteristics value and the welding phenomenon monitor 2 for calculating a variational amount of the welding characteristics value and for providing and displaying the analog output, wherein the measuring instrument 1 and the monitor 2 are independently provided. On the contrary, this embodiment has a simple construction and is capable of highspeed continuous and repeated measurement since the variation amount in the welding characteristics value can be obtained by merely carrying out a continuous and repetitive counting as to the welding characteristics value.

The apparatus shown in FIG. 3 comprises a high frequency voltage sensing element 4, a high frequency current sensing element 5, a low pass filter 6, a welding characteristics subtracting counter 8, a reset signal generating device 9 for supplying a reset signal to the welding characteristics subtracting counter 8 when receiving a sampling completion signal of the counter 8, a minuend signal storage unit 31 for supplying a minuend signal to the counter 8, a D/A converter 13 for converting an output of the counter 8 into analog signals, and a monitoring device 14 for displaying variations in an analogized welding characteristics value.

Each of the voltage sensing element 4, current sensing element 5, the low pass filter 6, the D/A converter 13 and the monitoring device 14 has the same function as that of the corresponding device designated by the same reference numeral in the embodiment shown in FIG. 2.

The welding characteristics subtracting counter 8 has both the functions of a preset counter and the welding characteristics counter 7, one of these functions is selected and utilized by an optional switching action. A difference between these functions resides in a point of whether the minuend has been already preset in a counting circuit or not at a starting time of the sampling. In case the subtracting counter 8 functions as the counter 7, an output of the subtracting counter 8 or the welding characteristics value is supplied to the minuend signal storage unit 31. On the contrary, when functioning as the preset counter, a calculated result is supplied to the D/A converter 13 and a signal from the storage unit 31 is preset in the counting circuit each time the resetting action is carried out after completion of the sampling.

Under these conditions, when receiving a signal from the low pass filter 6, "1" is automatically subtracted from a preset value each time the counting circuit conducts "1 count action", thus the counted result is equal to a remainder obtained by subtracting the welding characteristics value stored in the minuend signal storage unit 31 from the present welding characteristics value.

When the subtracting counter 8 functions as the welding characteristics counter 7, the minuend signal storage unit 31 receives an output of the subtracting counter 8, reversely converting a polarity of the output, in other words, calculating a complement of the output, which is to be stored until a succeeding input is applied.

In operation, the subtracting counter 8 is set as the counter 7 when the measurement is initiated, and continuously and repeatedly counts the welding characteristics value in timed relation with each reset signal supplied from the reset signal generator 9, providing the counted results as the outputs to the storage unit 31. The minuend signal storage unit 31 converts the respective output of the subtracting counter 8 into a complement signal which is produced as an output, which output is not supplied to the subtracting counter 8 under this operating condition.

Next, the subtracting counter 8 functions as the preset counter by the switching action, the outputs of the subtracting counter 8 are applied to the D/A converter 13 but not to the storage unit 31 in which a finally supplied input signal thereto is converted into the complement signal and stored therein, and further the complement signal is supplied to the subtracting counter 8.

When sampling starts, the subtracting counter 8 presets the complement signal in the counting circuit which conducts an operation of addition of the sampled welding characteristics value to the preset complement. Subtraction of the welding characteristics value stored in the storage unit 31 from the present welding characteristics value is carried out as a result of the abovementioned counting operation of the subtracting counter 8, thus both function of the counter 7 and the subtractor 12 can be achieved by the subtracting counter 8, and a signal supplied to the D/A converter 13 from the subtracting counter 8 approximately represents the variational amount of the welding characteristics value.

Operating personnels can manually adjust operating parameters such as the welding heat input or the welding rate in order to continuously carry out the welding process under the optimal welding phenomenon by observing the monitoring device 14, which has the same function as that of the monitoring device 14 shown in FIG. 2. Of course, an automatic adjustment for continuously performing the optimal welding process can be also conducted by supplying the output of the D/A converter 13 to the welding phenomenon controller 3.

Although a momentary value of the welding characteristics is utilized as the input signal or the minuend signal to the storage unit 11 or 31 in the embodiments shown by FIGS. 2, 3, the minuend signal for calculating the variational amount in the welding characteristics value is not limited thereto, for example, in case the oscillating frequency is measured and employed as the welding characteristics value, a nominal oscillating frequency rating of the welding machine may be available for the signal to be stored in the storage unit 11 or 31. It is essentially required to store and use the kind of signal being capable of eliminating a fixed component which does not relate to time in the welding characteristics value.

In general, the momentary welding characteristics value is preferably used as the stored signal in the storage unit 11 or 31 since the oscillating frequency tends to change in response to a difference in a size of the article to be welded or welding conditions, and simplicity in design of circuit construction can be obtained by utilization of the momentary welding characteristics value.

In addition, utilization of output signals of the PI controller 20 shown in this embodiment is not limited to a thyristor-type power source. The output signals may be used for a control of an induction voltage regulator or any other type power source.

The welding phenomenon monitor and the welding phenomenon controller disclosed in the above explanations are available for high frequency induction welding as well as Thermatool-type high frequency electric resistance welding, and the electric resistance welding according to the present invention can be applied to not only the welding process for making pipe disclosed hereinabove but also for making a sort of a shaped steel.

According to the present invention, the following advantages can be obtained:

(i) Operating personnel can easily recognize and discriminate the kind of welding phenomenon by observing the periodic variation pattern or the displayed quantitative value without performing qualitative observation concerning the spatter of the welding portion or the external welding flash or the like by using a high speed camera or a high speed video TV.

(ii) Useful information for quality control of the welded articles can be obtained from the recorded data concerning the welding characteristics value.

(iii) As a result of eliminating the necessity for skillful operation by skilled personnel, capability of manual or automatic fast adjustment as to operation parameter such as heat input, and capability of shortening the rising time at early stage in welding operation, a high efficiency welding operation can be achieved.

(iv) The stabilized welding phenomenon can be continuously accomplished during the welding operation, thereby inferiorities appearing in Flatness Inspection, Ultra Sonic Testing and Water Pressure Testing are eliminated.

These advantages improve reliability of the welded articles obtained by Electric Resistance Welding and further contributes to industrial development in many technical aspects.

What is claimed is:

1. An apparatus for monitoring and controlling a welding phenomenon in an electric resistance welding process, comprising:

a welding characteristics counter having an input means for receiving at least one input including a voltage and a current of high frequency which flows in a material to be welded in said process, an oscillator for generating reference time signals, a counting means for counting at least one of the voltage, the current and the reference time signals during a sampling gate time to carry out measurement of at least one welding characteristics value including an oscillating frequency, an oscillating period of said high frequency, and a phase difference between the voltage and current, said welding characteristics value changing in correspondence with the occurrence of periodic fluctuations in the shape of the high frequency welding current circuit formed in the material to be welded, said counter outputting a sampling completion signal after the completion of the sampling gate time;

a reset signal generator means connected to said welding characteristics counter for periodically producing reset signals and supplying them to said counter in a manner that said counter can perform its counting operation in a stable state, each reset signal causing said measurement of the welding characteristics value to start; and a monitoring device for receiving and displaying the outputs from said welding characteristics counter and for producing a control signal for use in maintaining optimum welding conditions in the welding process.

2. An apparatus for monitoring and controlling a welding phenomenon in an electric resistance welding process, comprising:

a welding characteristics counter having an input means for receiving at least one input including a voltage and a current of high frequency which flows in a material to be welded in said process, an oscillator for generating reference time signals, a counting means for counting at least one of the voltage, the current and the reference time signals during a sampling gate time to carry out measurement of at least one welding characterictics value including an oscillating frequency, an oscillating period of said high frequency, and a phase difference between the voltage and current, said welding characteristics value changing in correspondence with the occurrence of periodic fluctuations in the shape of the high frequency welding current circuit formed in the material to be welded, said counter outputting a sampling completion signal after the completion of the sampling gate time;

a reset signal generator means connected to said welding characteristics counter for periodically producing reset signals and supplying them to said counter in a manner that said counter can perform its counter operation in a stable state, each reset signal causing said measurement of the welding characteristics value to start;

a minuend signal storage device connected to said welding characteristics counter for storing an output signal from said counter as a minuend signal;

a subtractor circuit for receiving the sampled output from said welding characteristics counter and calculating a deviation between the sampled output and the minuend signal from said minuend signal storage device; and a monitoring device for receiving and displaying the outputs from said subtractor for producing a control signal for use in maintaining optimum welding conditions in the welding process.

3. An apparatus for monitoring and controlling a welding phenomenon in an electric resistance welding process, comprising:

a welding characteristics counter having an input means for receiving at least one input including a voltage and a current of high frequency which flows in a material to be welded in said process, an oscillator for generating reference time signals, a counting means for counting at least one of the voltage, the current and the reference time signals during a sampling gate time to carry out measurement of at least one welding characteristics value including an oscillating frequency, an oscillating period of said high frequency, and a phase difference between the voltage and current, said welding characteristics value changing in correspondence with the occurrence of periodic fluctuations in the shape of the high frequency welding current circuit formed in the material to be welded said counter outputting a sampling completion signal after the completion of the sampling gate time;

a reset signal generator means connected to said welding characteristics counter for periodically producing reset signals and supplying them to said counter in a manner that said counter can perform its counting operation in a stable state, each reset signal causing said measurement of the welding characteristics value to start;

a minuend signal storage device for storing an output signal from said welding characteristics counter as a minuend signal;

a subtractor circuit for calculating a deviation between the output signal of said welding characteristics counter and the minuend signal from said minuend signal storage device;

a digital-to-analog converter for converting the output from the subtractor circuit into an analog signal;

an AC amplifier for receiving said analog signal from said digital-to-analog converter for amplifying a variational component thereof;

an AC voltmeter for rectifying and integrating the output from said AC amplifier to obtain a welding phenomenon quantitative value; and a welding phenomenon quantitative value display device for displaying the output from said AC voltmeter.

4. An apparatus for monitoring and controlling a welding phenomenon in an electric resistance welding process, comprising:

a welding characteristics subtracting counter having a counter mode and a preset mode, and including an input means for receiving at least one input including a voltage and a current of high frequency which flows in a material to be welded in said process, an oscillator for generating reference time signals, a counting means for counting at least one of the voltage, the current, and the reference time signals during a sampling gate time when said subtracting counter operates in both its counter and preset modes to carry out measurement of at least one welding characteristics value including an oscillating frequency, an oscillating period of said high frequency, and a phase difference between the voltage and current, said welding characteristics value changing in correspondence with the occurrence of periodic fluctuations in the shape of the high frequency welding current circuit formed in the material to be welded, and for conducting a subtraction operation of said welding characteristics value from a preset value in the preset mode, and switching means for changing the operation of the subtracting counter from its counter mode to its preset mode said counter outputting a sampling completion signal after the completion of the sampling gate time;

a minuend signal storage unit for receiving an output of said welding characteristics subtracting counter and converting said output into a complement signal and further storing said complement signal therein during the counter mode of the subtracting counter, and for providing a complement signal in the counter mode of the subtracting counter as said preset value to the subtracting counter during the preset mode thereof, said complement signal being one which is stored in the storage unit at the time just before operation of said switching means;

a reset signal generator means connected to said welding characteristics subtracting counter for periodically producing reset signals and supplying them to said counter in a manner that said counter can perform its counting operation in a stable state; each reset signal causing said measurement of the welding characteristics value to start; and a monitoring device for receiving and displaying the outputs from said welding characteristics counter and for producing a control signal for use in maintaining optimum welding conditions in the welding process.

5. An apparatus as in claim 1, further comprising;
a digital-to-analog converter for converting the output signal from said welding characteristics counter into an analog signal; and
wherein said monitoring device displays said analog signal to show the type of welding phenomenon which occurs.

6. An apparatus as in claim 2, further comprising;
a digital-to-analog converter for converting the output signal from said subtractor into an analog signal; and
wherein said monitoring device displays said analog signal to show the type of welding phenomenon which occurs.

7. An apparatus as in claim 4, further comprising;
a digital-to-analog converter for converting the output signal from said welding characteristics subtractor counter into an analog signal; and
wherein said monitoring device displays said analog signal to show the type of welding phenomenon which occurs.

8. An apparatus according to claim 4, further comprising:
a reference signal set-point station provided in said minuend storage unit for presetting a reference signal to be utilized as said preset signal in place of said final complement signal.

9. An apparatus according to claims 1, 2, 3, or 4, further comprising;
a low pass filter coupled between said sensing elements and said counter for eliminating high harmonics contained in the signals from said sensing elements.

10. An apparatus according to claims 1 or 2 further comprising;
a reference signal set-point station provided in said minuend storage device for presetting a reference signal to be utilized as said minuend signal in place of said output signal of said welding characteristics counter.

11. An apparatus according to claims 1, 2, 3 or 4, wherein said reset signal generator produces more than 100 reset signals per second.

12. An apparatus according to claims 1, 2, 3 or 4, wherein said reset signal generator delays the sampling completion signal from said counter to use a resulting signal as the reset signal, the amount of time delay of the reset signal with respect to the sampling completion signal being determined so that said counter can perform its counting operation in a stable state.

13. An apparatus according to claims 1, 2, 3 or 4, wherein said reset signal generator periodically produces the reset signals, each reset signal having a proper timing relationship with the corresponding sampling completion signal.

14. An apparatus according to claims 2 or 3, further comprising:
a switch means connected between said welding characteristics counter and said minuend signal storage device, for receiving an output from said welding characteristics counter and being actuated when said high frequency reaches its stationary state and supplying an output signal to said minuend signal storage device as said minuend signal in place of said output signal from said counter.

15. An apparatus as in claim 3, further comprising;
a welding phenomenon set-point station for presetting a reference signal;
a comparator for calculating an amount of an error signal between the output of said AC voltmeter and that of said welding phenomenon set-point station; and
a controller for receiving said error signals and producing signals for controlling the welding phenomenon.

16. An apparatus according to claims 3 or 10, further comprising;
a welding phenomenon quantitative value recorder for recording the outputs from said AC voltmeter.

17. An apparatus as recited in claim 15, further comprising;
an AC power source controller for receiving the signals from said controller to control the amount of power supplied to a high frequency welding machine.

* * * * *